(12) United States Patent
Chen (10) Patent No.: US 8,167,100 B2
(45) Date of Patent: May 1, 2012

(54) DAMPING DEVICE

(75) Inventor: Guo-Bin Chen, Xiamen (CN)

(73) Assignee: Hoti (Xiamen) Plumbing Inc., Xiamen (CN)

(*) Notice: Subject to any disclaimer, the term of this patent is extended or adjusted under 35 U.S.C. 154(b) by 0 days.

(21) Appl. No.: 12/600,271

(22) PCT Filed: Apr. 29, 2009

(86) PCT No.: PCT/CN2009/071560
§ 371 (c)(1),
(2), (4) Date: Nov. 16, 2009

(87) PCT Pub. No.: WO2009/132589
PCT Pub. Date: Nov. 5, 2009

(65) Prior Publication Data
US 2011/0209305 A1 Sep. 1, 2011

(30) Foreign Application Priority Data
Apr. 30, 2008 (CN) .................. 2008 2 0102186 U (51) Int. Cl.
*F16D 57/00* (2006.01)
(52) U.S. Cl. ........................................ 188/290; 188/296

(58) Field of Classification Search .......... 188/290–296, 188/306; 16/82, 83; 74/573 F
See application file for complete search history.

(56) References Cited

U.S. PATENT DOCUMENTS

| | | | | |
|---|---|---|---|---|
| 5,720,370 A * | 2/1998 | Takahashi | ...................... | 188/310 |
| 6,725,984 B2 * | 4/2004 | Orita | .............................. | 188/290 |
| 6,840,355 B2 * | 1/2005 | Iwashita | ...................... | 188/290 |
| 7,322,450 B2 * | 1/2008 | Orita | .............................. | 188/296 |
| 7,798,296 B2 * | 9/2010 | Iwashita | ...................... | 188/290 |
| 2003/0234145 A1 * | 12/2003 | Iwashita | ...................... | 188/290 |

* cited by examiner

*Primary Examiner* — Christopher Schwartz (57) ABSTRACT

A damping device comprises an axle, a housing, a unidirectional member, and a damping oil. The unidirectional member in cross section is formed like a T-shape, and a top portion thereof is formed as an arc to cooperate with the housing's inner wall. Where the unidirectional member contains a U-shaped slot is defined oil holes interlaced with the gap of the first slot wall. The lifting of the cover generates little damping and the closing thereof generates a variable and yet optimal damping. The undersized unidirectional member also adds strength to the structure. The diminished cross-section of the unidirectional member contributes to a smaller U-shaped slot.

9 Claims, 11 Drawing Sheets

DAMPING DEVICE

BACKGROUND OF THE INVENTION

1. Field of the Invention

The present invention relates to a damping device, in particular to a damping device for a toilet seat cover with a greatly reduced damping while being lifted up and with a variable optimal damping while being closed down.

2. Description of the Related Art

Damping devices are extensively applied to movable covers that usually require a unidirectional damping force. For example, it is desired that no damping force would be generated during the lifting of a toilet seat cover. In contrast, the damping force would be desired during the closing of the toilet seat cover. The existing damping device generally applies a unidirectional blade to serve as an oil switch and also provides a unidirectional obstruction against the damping oil to achieve the one-way damping efficiency. However, the oil channel is often unable to be entirely closed due to the defective cooperation and functioning of the unidirectional blade and the housing, subject to the manufacturing inaccuracy and deformation, and therefore is not able to produce a desired damping to fit the practical need. Moreover, since the design of the damping device is localized in a certain respect, resulting in deficiencies such as bulky in structure, insufficient strength, switch being dull, or insufficient turning angles.

Figure 13:
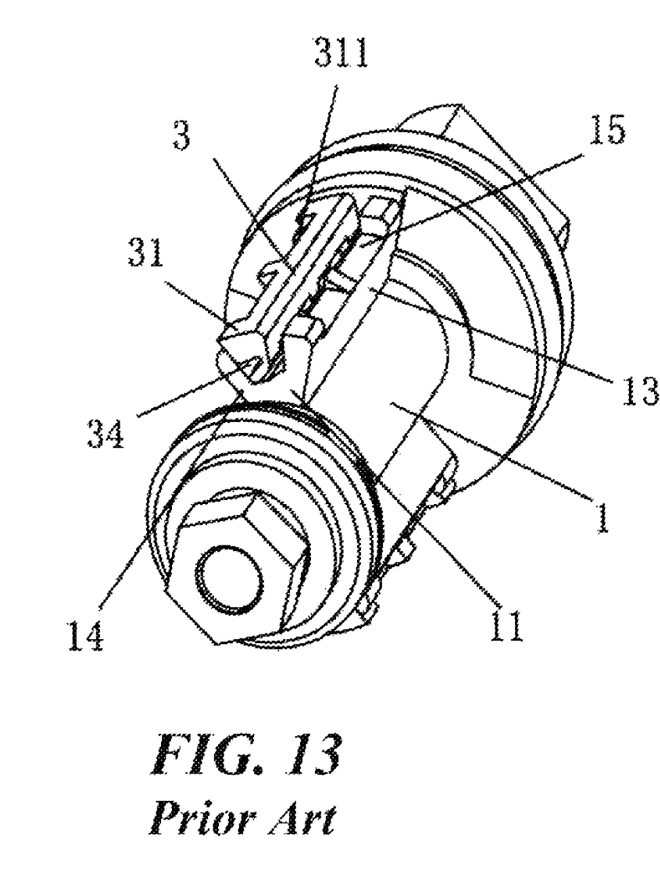
FIG. 13 is a perspective view showing the cooperation of the unidirectional member and the axle of the prior art.
Figure 14:
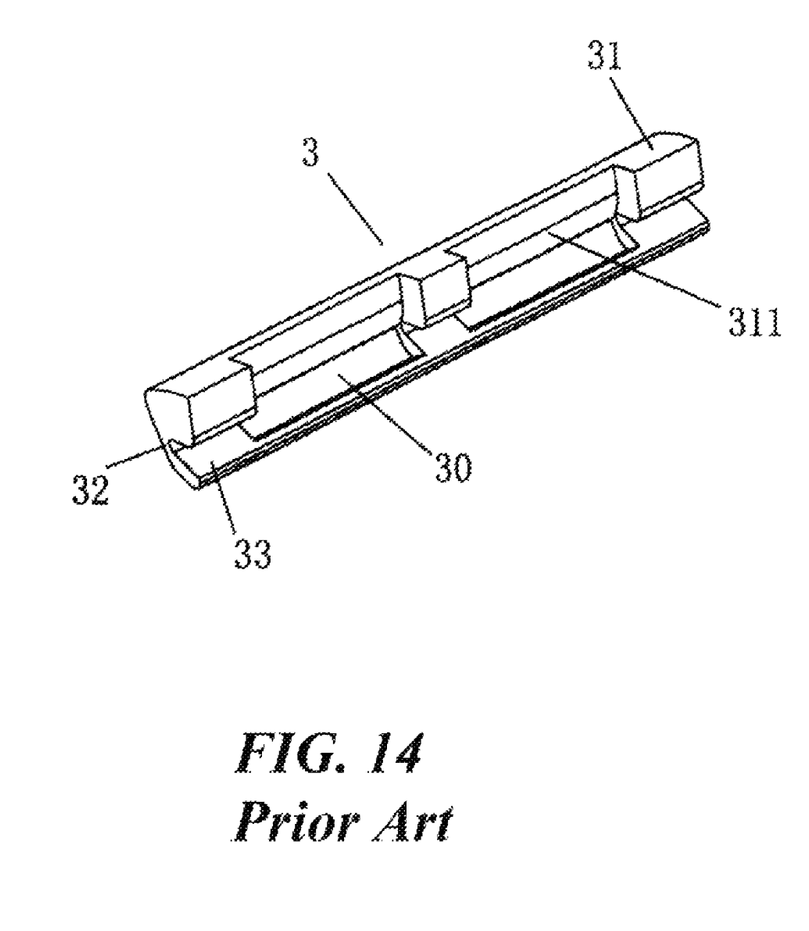
FIG. 14 is a schematic view showing the unidirectional member of the prior art.

A damping device is disclosed by the China Patent No. 200620009503.6. Referring to FIGS. 13 and 14, the damping device includes an axle 1', a housing, a unidirectional member 3', and damping oil. Wherein, the housing has two obstructing walls integrally and extensively installed on an inner wall toward a center thereon. The axle 1' is installed within the housing, and an outer wall of the axle 1' props against two top ends of said obstructing walls. The axle includes two ribs integrally and extensively installed thereon. An unoccupied space inside the sealed housing is filled up by the damping oil. The ribs 11' form U-shaped slots 12' in cross-section which are axially disposed along the axle 1'. On two sides of each U-shape slots respectively form a first slot wall 13' and a second slot wall 14'. Wherein, at least one first gap 15' is respectively formed on an upper end of the first and the second slot walls 13', 14' extending toward the insides thereof. The unidirectional member 3' is pivotally received in the U-shaped slots 12' at the ribs 11' of the axle 1' so as to freely prop between the inner wall of the housing and the bottom of the U-shaped slots 12'. An interval is defined between the unidirectional member 3' and the slot walls of the U-shaped slots 12', so that the unidirectional member 3' would move along the peripheral direction within the slots 12'. The unidirectional member 3' includes a first section 31' that props against the inner wall of the housing, a second section 32' that is movable set near the first section 13' of the axle 1', and a third section 33' that props against the bottom of the slot. Wherein, the portion between the first and second sections 31', 32' and the portion between the second and third sections 32', 33' are bent and integrally engaged. Thereby, at least one oil hole 30' is defined on the second section 32' or on the engaging portion between the second and the third sections 32', 33'. Additionally, the oil hole 30' of the unidirectional 3' in the U-shaped slots 12' would be staggered with the gap 15' of the first slot wall 13'. Thus, this invention utilized the closing of the toile seat cover to achieve a preferable damping efficiency and to solve the problem of the blunt switch of the damping device.

However, in the practical application, an oil channel composed by the gap 15' of the first slot wall 13', the oil hole 30' of the unidirectional member 3', and the gap of the second slot wall 14' would impede the fluent travel of the damping oil. Therefore, the lifting of the toilet seat cover would be also affected by a certain degree of damping efficiency. Herein, in order to ensure the smooth travel of the oil while lifting the toile seat cover, a second gap is further defined on the outer portion of the first section 31', and an indentation 34' is further embraced between the second and the third sections 32', 33'. By means of the indentation 34', the cross-section of the unidirectional member 3' is larger since the structural strength of the unidirectional member 3' also has to be reserved, which conduces to a larger U-shaped slot 12'. Wherein, a turning angle of rib 11' of the axle 1 between the two obstructing walls is directed to a lifting angle of the toilet seat cover. The angle is usually set in the range from 100 to 105 degrees. In view of the restrictive angle, the width of the rib 11' in cross-section should not be too large, which contradict the fact that the width should be concurrently large enough to satisfy the larger U-shaped slots 12'. For meeting the above requirements, the thickness of the slot walls of the convention structure is reduced, which however decreases the structural strength and seriously affects the using life thereof.

SUMMARY OF THE INVENTION

Therefore, the object of the present invention is to provide a damping device for the toilet seat cover; whereby, the lifting of the cover would be easier because of free of damping, and the closing of the cover produces an optimal damping. The simplified structure and an extended life time are the advantages of the present invention.

The device in conformity with the present invention comprises the features:

A damping device mainly comprises an axle, a housing, a unidirectional member, and damping oil. The housing has two obstructing walls integrally and extensively installed on an inner wall toward a center thereon for an outer wall of the axle to push against. The axle includes two inward symmetric ribs integrally and extensively installed thereon, each of which further axially defines a slot to pivotally receive the unidirectional member; the unidirectional member is movably disposed within the slot. The slot includes gaps respectively spaced on two side walls thereof. The unidirectional member accompanying with the axle is tightly coupled to the housing, and an unoccupied space inside the sealed housing is filled up with the damping oil. An oil hole defined inside the slot of the unidirectional member is staggered (or not in line) with one of the gaps on the slot, and another oil hole of the unidirectional member is intercommunicated with other gap on the slot. One side of the unidirectional member that pushs against the slot wall with the staggered gap further provides with a plurality of longitudinal bars.

The unidirectional member has a cross-section that is formed like a T, and a top portion thereof is formed as an arc in conformity with the inner wall of the housing.

The ribs have cross-sections that are formed as U-shaped; a width of an opening part of the slot is wider than a width of a bottom part thereof; each U-shaped slot adopts an inclined slot, whose two sides respectively form a first slot wall and a second slot wall that is disposed lower than the first slot wall.

The first slot wall has a plurality of gaps defined thereon at intervals, and the second slot wall has a plurality of gaps defined thereon.

A plurality of longitudinal bars, along the axle, are axially disposed on a side of the unidirectional member that pushes against the second slot wall.

The axle further includes a hollow axle body and a metal shaft fixed within the axle body; the axle body is integrally formed to seal a bottom portion at a bottom end of the housing, and the bottom portion is installed inside the bottom end of the housing.

An inner side of the bottom portion provides with an oil slot that is defined with a certain angle; a depth of the oil slot is gradually reduced from an initial-close position of the unidirectional member toward a backward direction thereof, so that the oil slot is completely diminished when reaching a position with an angle over a preset angle.

A crown of the axle sequentially passes through a seal member, a sealed fixing member, a connecting member, and a locking member for being installed inside a top side of the housing; an inner wall at the top of the housing further cooperates with a protruding portion.

An inner side of the protruding portion provides with an oil slot that is defined with a certain angle; a depth of the oil slot is gradually reduced to zero from an initial-close position of the unidirectional member toward a backward direction thereof, so that no oil slot can be defined when exceeding a position with a certain angle.

When lifting the housing with respect to the unidirectional member, no damping would be generated and one wall of the housing would sustain a vertical force; when the unidirectional member is closed, a damping would be generated and other wall of the housing would sustain a force, and the wall is inclined with respect to the force direction by an included angle less than 90 degrees.

In lifting the toilet seat cover, the damping oil pushs the unidirectional member toward the second slot wall for the longitudinal bars to push against thereon, so that an interstice is defined between the unidirectional member and the second slot wall. Wherein, the damping oil would fluently travel along the first slot wall's gap, the interstice between the first slot wall's upper end and the inner wall of the housing, the interstice between the unidirectional member and the first slot wall, the unidirectional member's oil hole, the interstice between the unidirectional member and the second slot wall, the second slot wall's gap, and the interstice between the second slot wall's upper end and the housing's inner wall. Therefore, no damping would be produced. In closing the toilet seat cover, the damping oil propels the unidirectional member to fitly contact with the first slot wall. Wherein, the damping oil travels along the second slot wall's gap, the interstice between the second slot wall's upper end and the housing's inner wall, the interstice between the unidirectional member and the second slot wall, and the oil slot. Thereby, by means of that the oil slot is gradually reduced along with the closing of the cover, the damping force would be gradually increased until the oil slot is completely diminished at the predetermined angle, and the oil thence cannot pass therethrough. Since the travel of the damping oil is obstructed, the damping oil can merely travel through the interstices between the interrelated elements. Accordingly, the damping is increased to the maximum. Therefore, the falling speed of the cover, when closing the cover down, drops gradually from an initially faster velocity to a slower velocity at the moment the cover is completely closed.

Accordingly, the present invention takes advantage of the unidirectional member providing with the oil hole and one side of the unidirectional member that pushs against on the slot wall with the staggered gap further providing with a plurality of longitudinal bars. Whereby, the damping oil can be assured to travel smoothly without difficulties through the interstice formed between the bars, so that the lifting of the cover is free of damping and hence smooth, while a preferable damping would be achieved when closing the cover. Even if the lifting or closing angle of the cover is small, the damping efficiency can be also delicate. Moreover, the positioning of the bars of the present invention can efficiently decrease the dimension of the unidirectional member but at the same time assure the structural strength thereof. Additionally, since the cross-section of the unidirectional member is reduced, the size of the U-shaped slot is correspondingly decreased. Therefore, while the turning angle is improved, the U-shaped slot wall of great thickness and the obstructing wall together also contribute to effectively increase the life cycle of the damping device of the present invention.

DETAILED DESCRIPTION OF THE PREFERRED EMBODIMENTS

Figure 1:
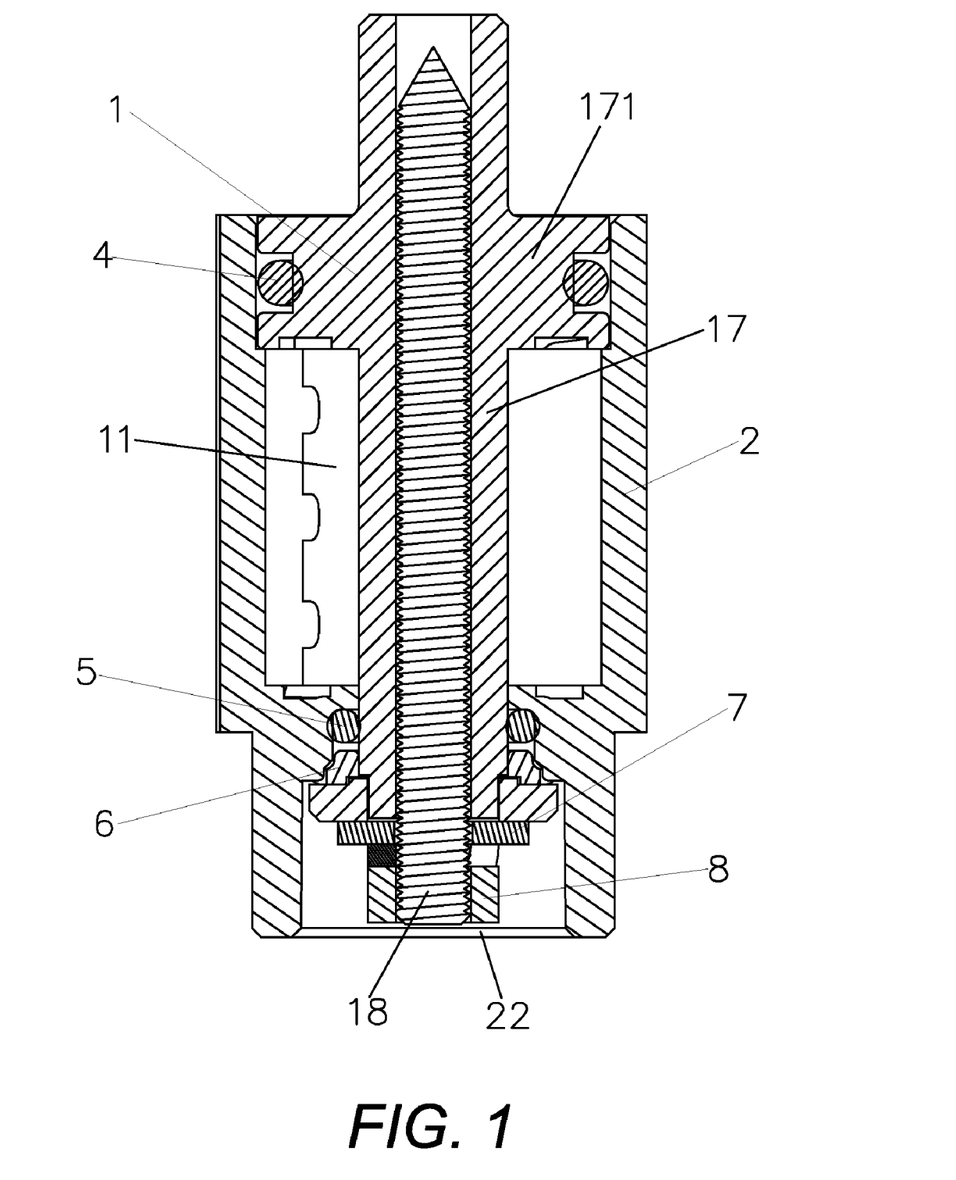
FIG. 1 is a cross-sectional view showing the present invention.
Figure 2:
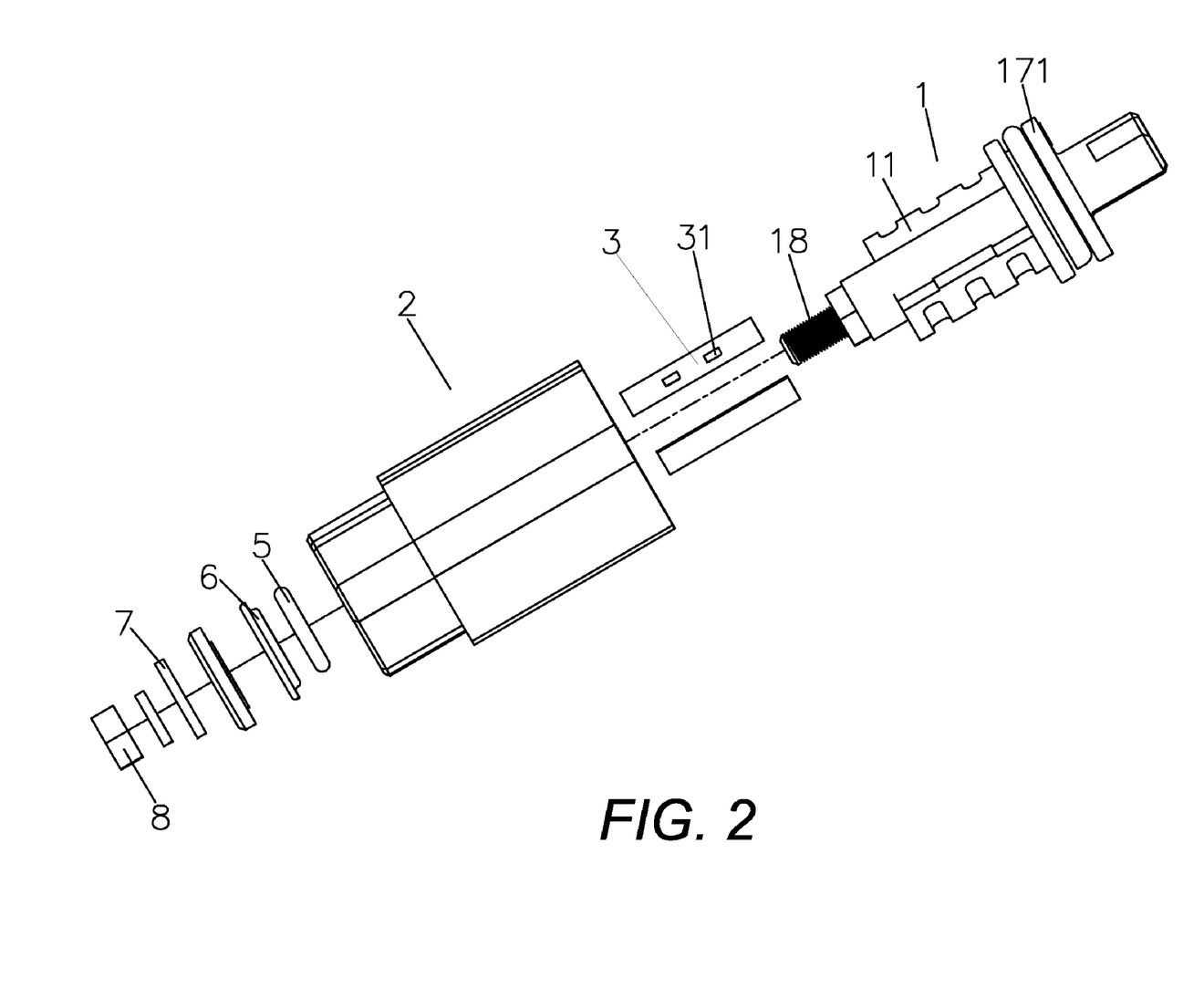
FIG. 2 is an exploded view showing the present invention.
Figure 3:
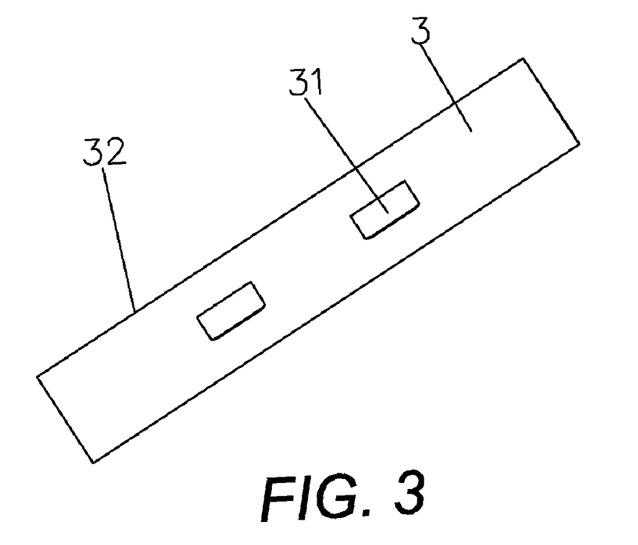
FIG. 3 is a schematic view showing the unidirectional member.
Figure 4:
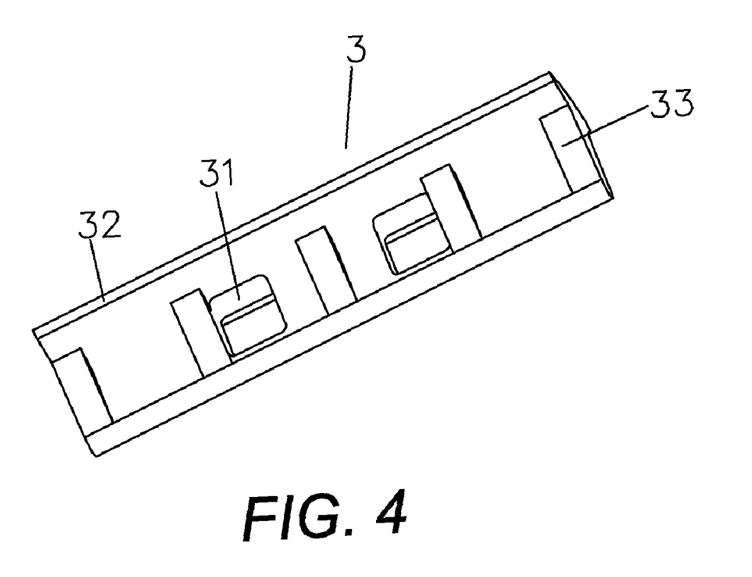
FIG. 4 is another schematic view showing the unidirectional member.
Figure 5:
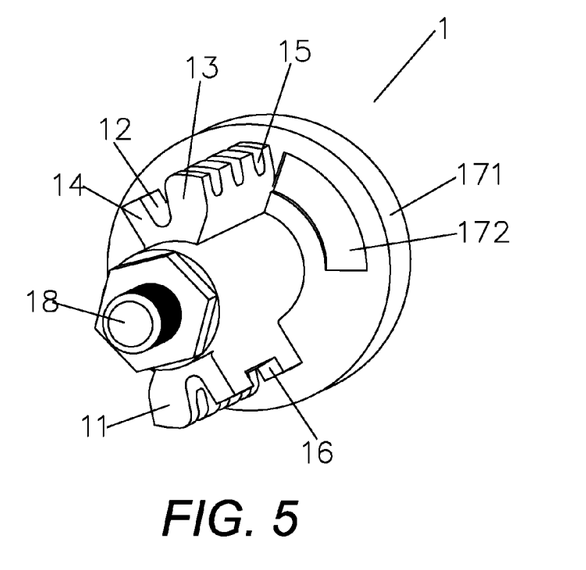
FIG. 5 is a perspective view showing the axle.
Figure 7:
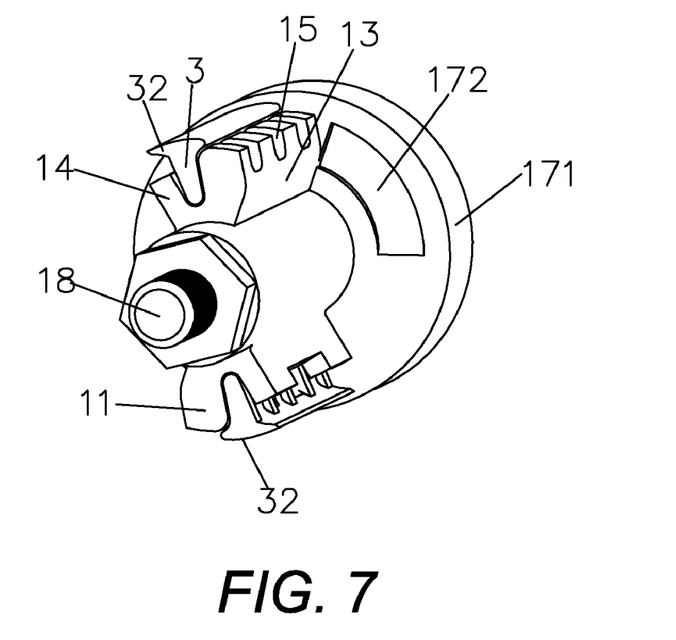
FIG. 7 is a perspective view showing the unidirectional member cooperating with the axle.
Figure 8:
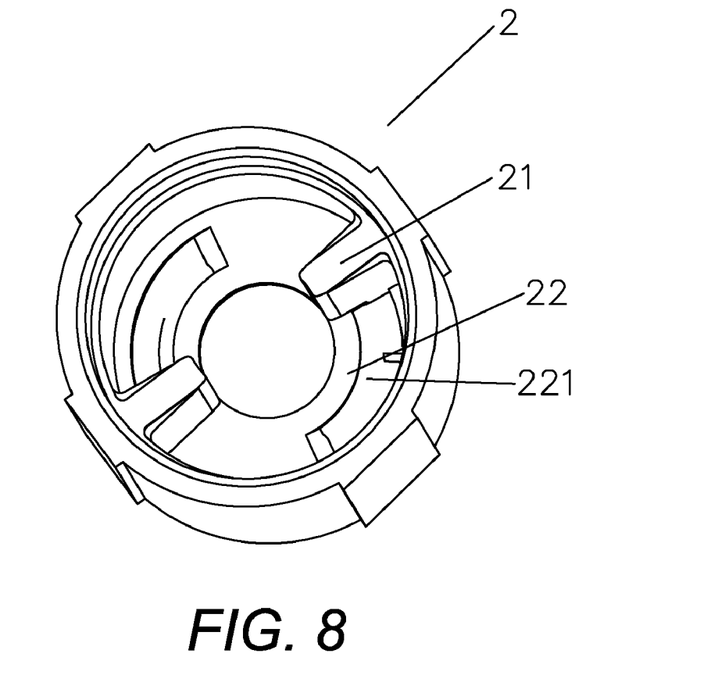
FIG. 8 is a perspective view showing the housing.

Referring to FIGS. 1 to 5 showing the present invention mainly comprises an axle 1, a housing 2, a unidirectional member 3, and damping oil, a first seal member 4, a sealed fixing member 6, a connecting member 7, a locking member 8. Wherein, the housing 2 has two obstructing walls 21 integrally and extensively installed on an inner wall toward a center thereon. The axle 1 is installed within the housing 2, and an outer wall of the axle 1 props against two top sides of the obstructing walls 21 of the housing 2 (as shown in FIG. 8). The axle 1 includes two inward symmetric ribs 11 integrally and extensively installed thereon. An unoccupied space inside the sealed housing 2 is filled up by the damping oil. Each of the ribs 11 further axially defines a U-shaped slot 12 in cross section. The U-shaped slots 12 adopt inclined slots, and a width of an opening part of the slot 12 is wider than a width of a bottom part thereof. On two sides of the U-shaped slot 12, a certain interval is defined between the top end and inner wall of the housing 2. Wherein, the U-shaped slot 12 further respectively forms a first slot wall 13 and a second slot wall 14 that is disposed below the first slot wall 13. The first slot wall 13 has a plurality of first gaps 15 inwardly defined from the top end for providing a communicative efficiency of the slots, and the second slot wall 14 has a wider second gap 16 inwardly defined from the top end for providing a communicative efficiency of the slots. As it should be, a plurality of the second gaps 16 can be acceptably disposed as well. The unidirectional member 3 is pivotally received in the U-shaped slots 12 of the ribs 11 and freely props between the inner wall of the housing 2 and the bottom of the U-shaped slots 12. An interval is defined between the unidirectional member 3 and the slot walls of the U-shaped slots 12, so that the unidirectional member 3 could be moved along the periphery of the axle 1 within the slot 12. Further referring to FIG. 7, the cross-section of the unidirectional member 3 is formed like a T-shape. Wherein, the top portion 32 of the unidirectional member 3 is formed as an arc in conformity with the inner wall of the housing. The unidirectional member further has a plurality of oil holes 31 formed inside the U-shaped slots 12. Wherein, the oil holes 31 are staggered with the first gap 15 on the first slot wall 13. Moreover, one portion included by the unidirectional member 3 that props on the second slot wall 14 further provides with a plurality of longitudinal bars 33 (as shown in FIG. 4).

Figure 6:
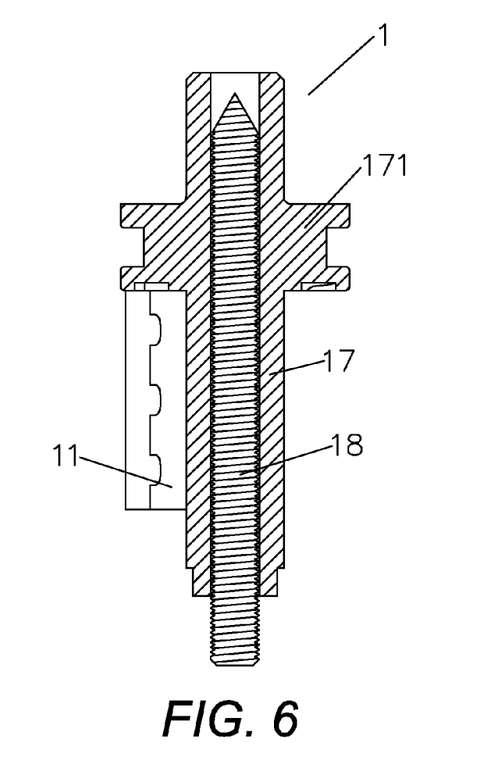
FIG. 6 is a cross-sectional view showing the axle.

Referring to FIG. 6, the axle 1 further includes a hollow axle body 17 and a metal shaft 18 fixed within the axle body. At the bottom of the axle 1, a bottom portion 171 is integrally formed from the axle body 17 for being applied to seal a bottom end of the housing 2, and the bottom portion 171 is installed inside the bottom end of the housing 2 via the first seal member 4. An inner side of the bottom portion 171 provides with an oil slot 172. A depth of the oil slot 172 is growing shallower from an initial-close position of the unidirectional member 3 (directed to the corresponding position of the unidirectional member 3 in time of the toilet seat cover being lifted to its extreme position) toward a backward direction thereof, so that no oil slot is defined in case of exceeding a position set over the certain angle. The metal shaft 18 provides with spiral threads for engaging with the locking member 8. A crown of the axle 1 sequentially passes through a second seal member 5, the sealed fixing member 6, the connecting member 7, and the locking member 8 for being installed inside a top side of the housing 2. Referring to FIG. 8, the inner wall at the top of the housing 2 further cooperates with a protruding portion 22. The other oil slot 221 is correspondingly defined at the inner side of the protruding portion 22 to the oil slot 172. As it should be, shims could be alternatively positioned between the elements for achieving a firmer structure. When the house 2 with respect to the unidirectional member 3 is lifted, no damping would be generated and one wall of the housing would sustain a vertical force. When the unidirectional member 3 is comparatively closed, a damping would be generated and other wall of the housing 2 would sustain a force, and the wall is inclined with respect to the force direction by an included angle less than 90 degrees. Thereby, the moment of the larger imparting force can be decreased, so that the obstructing wall 21 would possess a superior sustaining strength.

Figure 9:
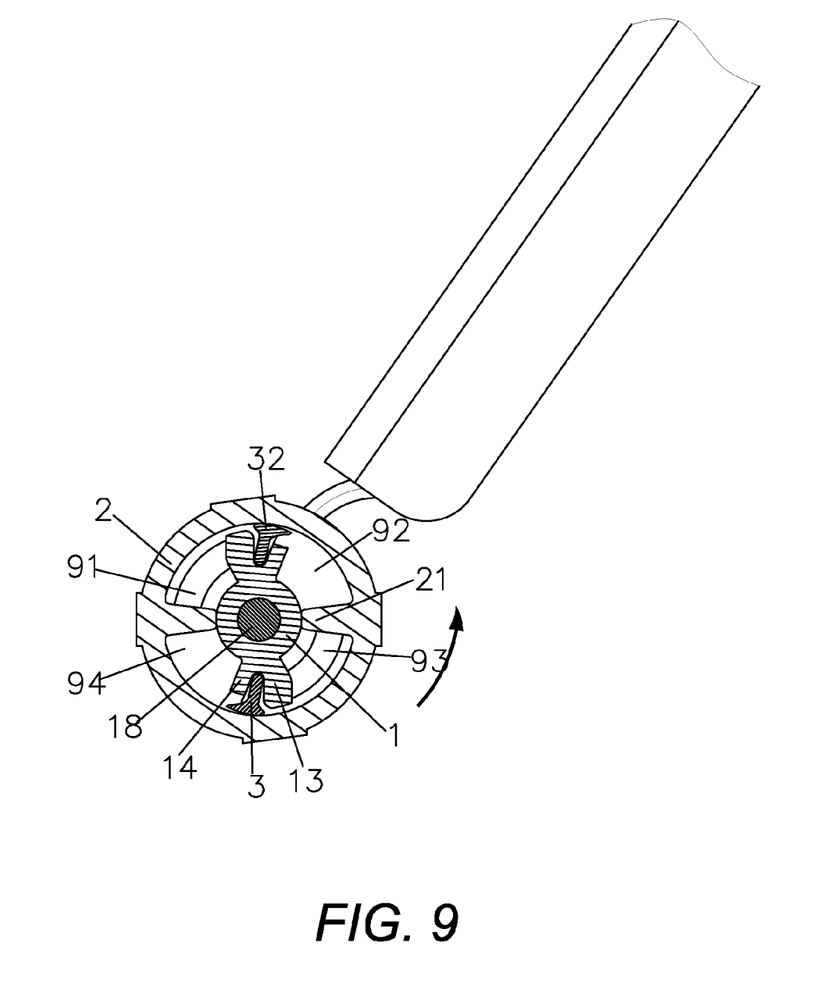
FIG. 9 is a cross-sectional view showing the toilet seat cover being lifted.
Figure 10:
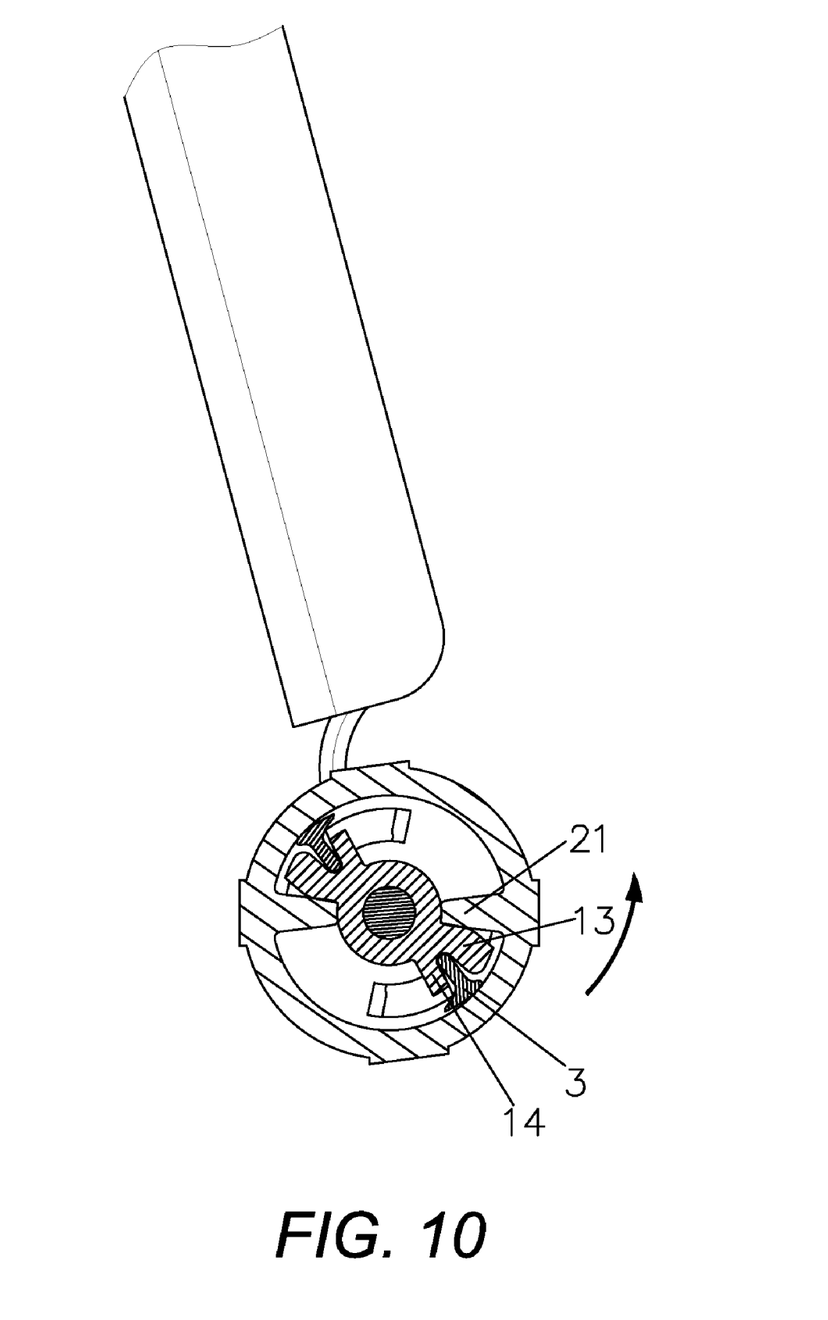
FIG. 10 is a cross-sectional view showing the toile seat cover being lifted to its extreme position.

FIG. 9 shows the condition of the damping device during the lifting of the toilet seat cover. Wherein, the housing 2 is fixed, the axle 1 spins counterclockwise as a result of the opening of the toilet seat cover. The two obstructing walls 21 and the two ribs 11 divide the inner accommodation of the housing 2 into four rooms 91, 92, 93, 94. In time of lifting the toile seat cover, the rooms 91 and 93 become smaller, but the rooms 92 and 94 become larger. Thereby, the damping oil would be propelled to flow from the rooms 91 and 93 towards the rooms 92 and 94, thence forcing the unidirectional member 3 to move towards the second slot wall 14, impelling the longitudinal bars 33 to prop against the second slot wall 14, and thus defining an interval between the unidirectional member 3 and the second slot wall 14. Concurrently, the damping oil smoothly travels along the first gap 15 of the first slot wall 13, the interval between the upper end of the first slot wall 13 and the inner wall of the housing 2, the interval between the unidirectional member 3 and the first slot wall 13, the oil hole 31 of the unidirectional member 3, the interval between the unidirectional member 3 and the second slot wall 14, the third gap 16 of the second slot wall 14, and the interval between the upper end of the second slot wall 14 and the inner wall of the housing 2. Wherein, no damping would be generated. Finally, the toile seat cover would be lifted to its extreme position as shown in FIG. 10, where the outer periphery of the first slot wall props against the obstructing wall 21 to form a lifting angle by 100 to 105 degrees.

Figure 11:
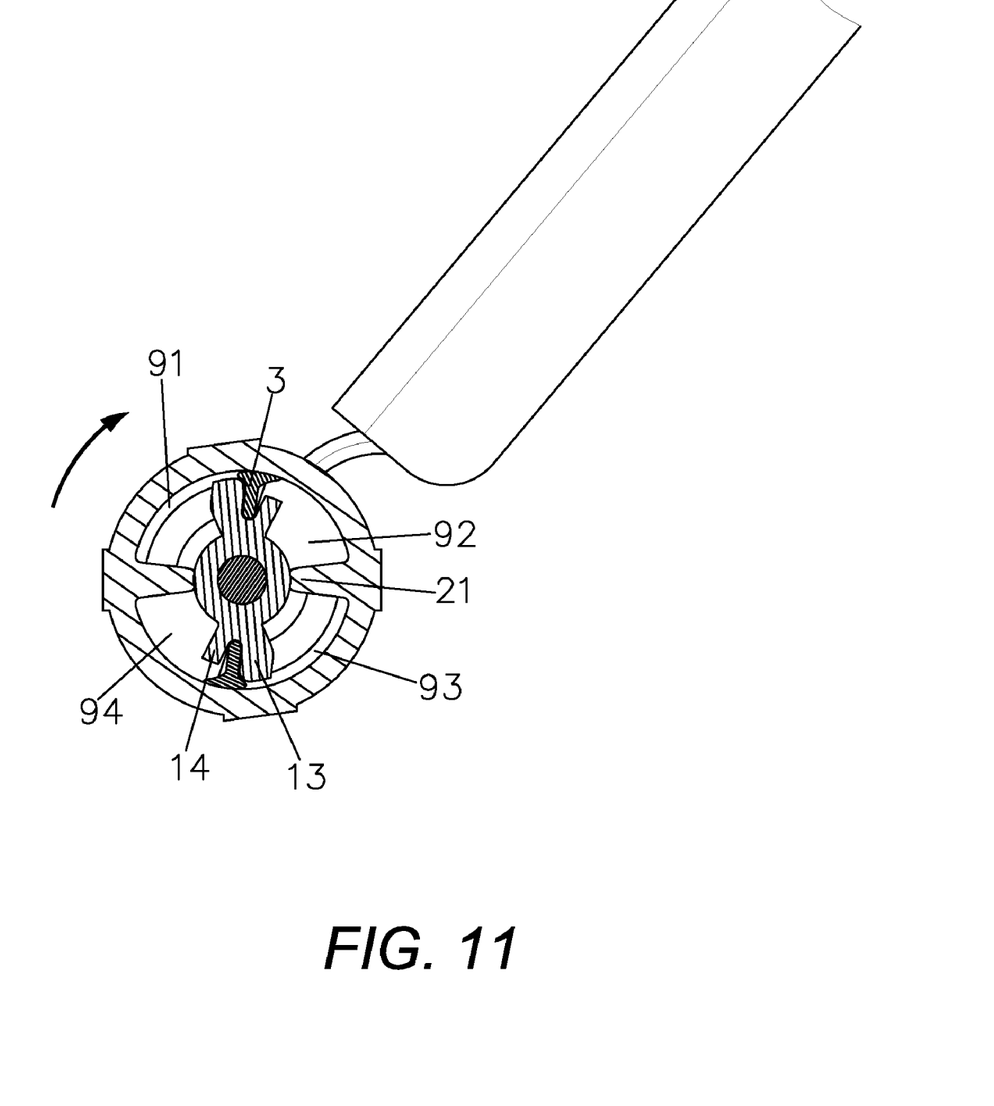
FIG. 11 is a cross-sectional view showing the toile seat cover being closed.
Figure 12:
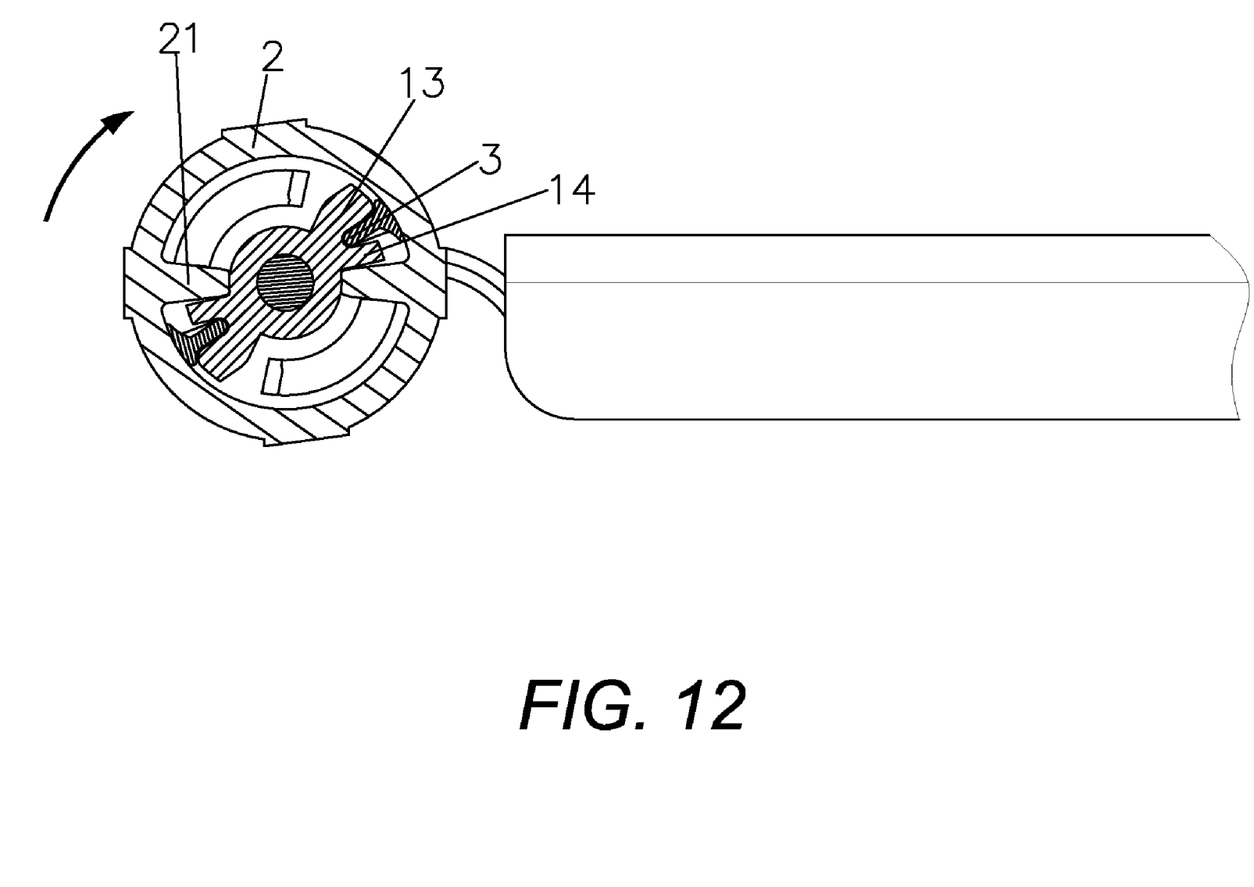
FIG. 12 is a cross-sectional view showing the toile seat cover being closed to its extreme position.

FIG. 11 shows the condition of the damping device in time of closing the toilet seat cover. The housing 2 is fixed for the axle 1 to be rotated clockwise along with the toilet seat cover. Wherein, the rooms 91 and 93 are getting larger while the rooms 92 and 94 are getting smaller. Thereby, the damping oil would be propelled to flow from the rooms 92 and 94 towards the rooms 91 and 93, and the unidirectional member 3 would be impelled to contact with the first slot wall 13. Herein, the oil hole 31 of the unidirectional member 3 is staggered with the first gap 15 of the first slot wall 13. Moreover, there is no interval between the unidirectional member 3 and the first slot wall 13. When the cover is initially to be closed, the damping oil travels along the third gap 16 of the second slot wall 14, the interval between the upper end of the second slot wall 14 and the inner wall of the housing 2, the interval between the unidirectional member 3 and the second slot wall, and the damping slots 172 and 221. Wherein, since the oil slots 172 and 221 become gradually shallow via the closing of the cover, the damping efficiency becomes more significant. After reaching a certain degree, there would be no more oil slots 172, 221, so that the oil channel is obstructed to impede the travel of the damping oil. Therefore, the damping oil could merely travel between the interstices of the respective elements, which concurrently generate a maximum damping efficiency. At last as shown by FIG. 12, the outer periphery of the second slot wall 14 props against the obstructing wall 21, and the toilet seat cover is entirely closed.

Accordingly, the unidirectional member 3 merely has to define a plurality of oil holes 31 and position a plurality of longitudinal bars 33 defined at a side of the unidirectional member 3 which props against the second slot wall 14. Thereby, the damping oil would thence smoothly travel through the intervals between the bars 33. No more indentation 34' has to be defined on the unidirectional 3' as issued by the prior art of CN200620009503.6. Thus, the present invention takes advantage of the diminished dimension of the unidirectional member 3 concurrently ensuring the structural strength thereof. Moreover, since the cross-section of the unidirectional member 3 is smaller, the U-shaped slot 12 can be correspondingly constructed undersized. In time of the turning angle is satisfied, the thicknesses of the slot wall of the U-shaped slot 12 and the obstructing wall 21 are still reserved for prolonging the using life of the present invention.

I claim:
1. A damping device for a toil seat cover, comprising:
an axle (1),
a housing (2),
a unidirectional member (3), and
damping oil; with said housing (2) having two obstructing walls (21) integrally and extensively installed on an inner wall of said housing (2) toward a center thereof for contacting an outer wall of said axle (1);

said axle (1) including two inward symmetric ribs (11) integrally extended thereon, said ribs (11) further axially defining a slot (12) to pivotally receive said unidirectional member (3);

said unidirectional member (3) being movable disposed within said slot (12);

said slot (12) including gaps (15, 16), formed at intervals, and, respectively, spaced on two slot walls (13, 14) thereof;

said unidirectional member (3) and said axle (1) being hermetically coupled to said housing (2), and an unoccupied space inside said sealed housing (2) being filled up by said damping oil;

wherein a plurality of oil holes (31), defined within said slot (12) and on said unidirectional member (3), being staggered with said gaps (15) on said slot wall (13), and communicated with other gaps (16) on another slot wall (14) within said slot (12); and a side of said unidirectional member (3) that contacts said slot wall (14) being axially disposed with a plurality of longitudinal bars (33)

said axle (1) further includes a hollow axle body (17) and a metal shaft (18) fixed within said axle body (17); said axle body (17) is integrally formed for sealing a bottom portion (171) at a bottom end of the housing (2), and said bottom portion (171) is installed inside said bottom end of the housing (2);

an inner side of the bottom portion provides with an oil slot (172) defined with an angle; and said two obstructing walls (21), along with said two ribs (11), dividing an inner accommodation of said housing (2) into four rooms (91, 92, 93, 94) of variable volume, depending on whether said toil seat cover is lifted up or pull down:

when said toil seat cover is lifted up, said damping oil flows from rooms (91 and 93) to rooms (92 and 94), reducing the damping, and when said toil seat cover is pulled down, said damping oil flows from rooms (92 and 94) to rooms (91 and 93), creating a maximum damping right before reaching a toil seat.

2. The damping device as claimed in claim 1, wherein said unidirectional member (3) has a cross-section formed in a T-like shape, and a top portion thereof is formed an arc in conformity with said inner wall of said housing (2).

3. The damping device as claimed in claim 1, wherein said ribs (11) form a U-shaped slot with a bigger opening at an upper part than at a bottom part thereof; said U-shaped slot adopts an inclined slot, whose two sides respectively form a first slot wall (13) and a second slot wall (14) that is disposed lower than said first slot wall.

4. The damping device as claimed in claim 1, wherein, a crown of said axle sequentially passes through a seal member (5), a sealed fixing member (6), a connecting member (7), and a locking member (8) for being installed inside a top side of said housing (2); an inner wall at said top of said housing (2) further cooperates with a protruding portion (22).

5. The damping device as claimed in claim 1, wherein, when said housing (2) is lifted with respect to said unidirectional member (3), no damping is induced and one wall of said housing sustains a vertical force; when said unidirectional member (3) is closed, a damping is induced and another wall of said housing (2) sustains a force, and said wall is inclined with respect to said force direction by an included angle less than 90 degrees.

6. The damping device as claimed in claim 1, wherein said ribs (11) form a U-shaped slot with a bigger opening at an upper part than at a bottom part thereof; said U-shaped slot adopts an inclined slot, whose two sides respectively form a first slot wall (13) and a second slot wall (14) that is disposed lower than said first slot.

7. The damping device as claimed in claim 1, when said housing (2) is lifted with respect to said unidirectional member (3), no damping is induced and one wall of said housing (2) sustains a vertical force; when said unidirectional member (3) is closed, a damping is induced and another wall of said housing (2) sustains a force, and said wall is inclined with respect to said force direction by an included angle less than 90 degrees.

8. A damping device for a toil seat cover, comprising:
an axle (1),
a housing (2),
a unidirectional member (3), and
damping oil; with said housing (2) having two obstructing walls (21) integrally and extensively installed on an inner wall of said housing (2) toward a center thereof for contacting an outer wall of said axle (1);

said axle (1) including two inward symmetric ribs (11) integrally extended thereon, said ribs (11) further axially defining a slot (12) to pivotally receive said unidirectional member (3);

said unidirectional member (3) being movable disposed within said slot (12);

said slot (12) including gaps (15, 16), formed at intervals, and, respectively, spaced on two slot walls (13, 14) thereof;

said unidirectional member (3) and said axle (1) being hermetically coupled to said housing (2), and an unoccupied space inside said sealed housing (2) being filled up by said damping oil;

wherein a plurality of oil holes (31) are defined within said slot (12) and on said unidirectional member (3), being staggered with said gaps (15) on said slot wall (13), and communicated with other gaps (16) on another slot wall (14) within said slot (12);

a side of said unidirectional member (3) that contacts said slot wall (14) is axially disposed with a plurality of longitudinal bars (33); and a crown of said axle (1) sequentially passes through a second seal member (5), a sealed fixing member (6), a connecting member (7), and a locking member (8) for being installed inside a top side of the housing (2), and an inner wall at the top of the housing (2) further cooperates with a protruding portion (22).

9. The damping device as claimed in claim 8, wherein said protruding portion (22) provides with an oil slot (172) defined with an angle, with a depth of said oil slot, relative to a position of a unidirectional member (3), gradually reduced from a point where said toil seat cover is completely open to null in a backward direction, or equivalently no oil slot is defined, once exceeding said angle.

* * * * *